Aug. 6, 1968   Y. SUNDBERG   3,396,229
DEVICE FOR INDUCTIVE HEATING AND/OR STIRRING
Filed June 7, 1965
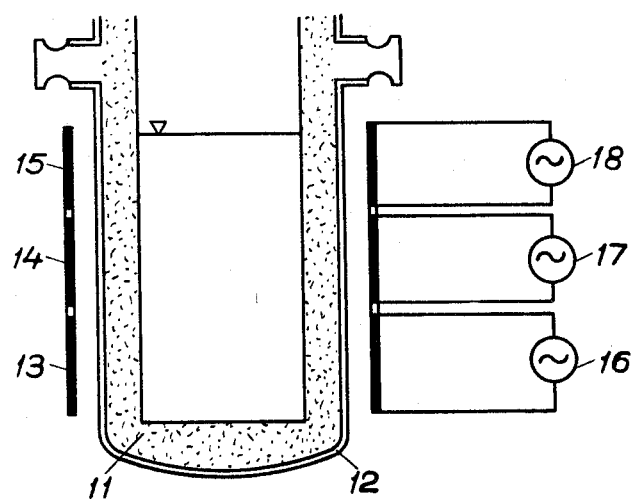
INVENTOR.
Yngve Sundberg
BY
Bailey, Stephens + Huettig
ATTORNEYS

United States Patent Office 3,396,229
Patented Aug. 6, 1968

3,396,229
DEVICE FOR INDUCTIVE HEATING AND/OR STIRRING
Yngve Sundberg, Vasteras, Sweden, assignor to Allmänna Svenska Elektriska Aktiebolaget, Vasteras, Sweden, a corporation of Sweden
Filed June 7, 1965, Ser. No. 461,921
Claims priority, application Sweden, June 22, 1964, 7,563/64
4 Claims. (Cl. 13—27)

ABSTRACT OF THE DISCLOSURE

A ladle is surrounded by a metallic casing, outside of which are positioned coils which are fed with current of a frequency of 0.1 to 10 cycles; the coils may be alternatively fed with single-phase current for heating or multiphase current for stirring. The ratio of the thickness of the casing ($\Delta$) to the depth of penetration of the eddy current induced by the coil flux ($\delta$) is $$\sqrt{\frac{2 \cdot \rho}{w \cdot \mu_0}}$$

where $\rho$ is the resistivity, $w$ is an angular frequency ($=2\pi$ times the frequency) and $\mu_0$ is the permeability in air.

---

The present invention refers to a device for inductive heating and/or stirring of melts in a ladle, comprising one or several coils placed outside the ladle and a metallic casing surrounding the ladle, preferably of non-magnetic steel.

A problem during degassing of molten steel in a ladle is that the temperature decreases during the degassing process, partly because of radiation and of heat conduction through the wall of the ladle and partly because of the addition of cold alloy additives to the charge. It is thus desirable to heat the melt during degassing or another treatment in the ladle. Different methods for effecting such a heating have been tried, for example the use of inductively heated graphite plates placed above the surface of the melt, or the use of arcs from electrodes above the surface of the melt. Inductive heating with a coil outside the casing of the ladle as not been considered feasible on account of the losses which thereby occur in the casing of the ladle.

The present invention considers a solution of these and other accompanying problems and is characterised in that the coil at least during stirring is arranged to be fed with current of a frequency which gives a depth of penetration in the casing material for the eddy current $\delta$ effected by the coil flux according to the formula $$\delta = \sqrt{\frac{2 \cdot \rho}{w \cdot \mu_0}}$$

where $\rho$ is the resistivity, $w$ the angle frequency $=2\pi \cdot$ the frequency and $\mu_0$ is the permeability in air, the value $\delta$ having such a relation to the casing thickness $\Delta$, that $\Delta/\delta \leq 0.1$. By making use of these dimensions, the losses in the casing of the ladle become moderate in comparison with the useful effect in the melt.

In a preferred embodiment the coil or coils are fed alternately with single and multi-phase currents for heating and motoric stirring respectively. By choosing the low frequency, in multi-phase connection it is also obtained that the stirring force becomes negligibly decreased through the influence of the casing. The dimension ratio is thus advantageous during heating (single-phase connection) as well as during motoric stirring (multi-phase connection). For vacuum operation at least the ladle and possibly also the coil are enclosed in the usual way in a vacuum-tight evacuable cover, which cover may be completely or partly formed by said casing.

The invention is explained more fully in the accompanying figure. In this a brick-lined ladle containing a melt such as steel is shown at 11. The ladle 11 has a vacuum-tight casing 12 of non-magnetic steel such as stainless steel. Around this there are three cylindrical coils 13, 14, 15, each fed from a frequency converter 16–18 with a frequency of 0.1–10 cycles per second, preferably 1–5 cycles per second. The thickness of the casing according to the invention has a predetermined ratio to the depth of penetration of the eddy current or currents in the actual non-magnetic steel, such as 0.1:1. 5 cycles per second can be mentioned as a suitable frequency, which according to the formula $$\delta = \sqrt{\frac{2\rho}{w \cdot \mu_0}}$$

gives the depth of penetration in the non-magnetic material (the permeability $\mu_0$, $\rho=$the resistivity and $w$ the angle frequency$=2\pi f$). The casing thickness ($\Delta$) is 10 mm. in the case shown. $\delta$ becomes 214 mm. at the mentioned frequency.

The three coils 13–15 placed axially are each fed by their own frequency converters, whose mutual phase angle in a suitable way is set between zero in single-phase installation (separate feeding to the coils) and for example 120° in three-phase stirring. The phase angles can be adjusted at the magnetisation in rotating machines, and in static converters with thyristors the phase angle may be controlled by the thyristors. With mercury arc rectifiers control is carried out at the grids.

Heating is carried out in a single-phase connection and stirring in three-phase connection with 120° mutual phase adjustment between the frequency converters. As another suitable frequency, 2.5 cycles per second can be mentioned, which gives $\delta=303$ mm.

$\Delta/\delta$ in the first case becomes 0.047 and in the second case 0.033.

$$\frac{P_1}{P_3} = \sqrt{\frac{\mu_{r3} \cdot \rho_3}{\mu_{r1} \cdot \rho_1}} \cdot 2\alpha_1 \cdot \Delta_1 \cdot \left[1 + 2 \cdot \frac{\alpha_3 \cdot \Delta_2}{\mu_{r3}} + 2\left(\frac{\alpha_3 \cdot \Delta_2}{\mu_{r3}}\right)^2\right]$$

where $\mu_r$ is the relative permeability, index 1 refers to the casing and index 3 refers to the melt, $\delta=$resistivity $$\alpha = \sqrt{\frac{w \cdot \mu_0 \mu_r}{2 \cdot \rho}}$$

$\Delta_1=$casing thickness
$\Delta_2=$width of the space between casing and melt At 5 cycles per second with $\Delta_1=10$ mm. and $\Delta_2=150$ mm. the following result is produced:

$$P_1/P_3=0.606$$

At 50 cycles per second with $\Delta_1=10$ mm. and $\Delta_2=150$ mm. the following result is produced:

$$P_1/P_3=10.5$$

The vacuum enclosure can be varied or completed in a known way, for example by means of an outer surrounding vacuum cover and the stirring can, if so desired, also be carried out by means of separate stirring means of electromagnetic type. Normally, the same electrical means are thus used for heating and stirring.

The invention can be varied in many ways within the scope of the following claims.

I claim:

1. Device for inductive stirring and heating of a melt in a ladle, said device comprising at least one coil positioned outside the ladle and a metallic casing around the ladle inside the coil, means to feed said coil alternatively with single-phase current for heating and multi-phase current for stirring, said means to feed the coil with multi-phase current including means to feed a current of a frequency of 0.1 to 10 cycles per second.

2. In a device as claimed in claim 1, said multi-phase current giving a depth of penetration in the casing material for the eddy current induced by the coil flux, said depth of penetration $\delta$ being $$= \frac{2 \cdot \rho}{w \mu_0}$$

where $\rho$ is the resistivity, $w$ the angular frequency $= 2\pi$ times the frequency and $\mu_0$ the permeability in air, the thickness ($\Delta$) of said casing in relation to the depth of penetration ($\Delta/\delta$) being not more than 0.1.

3. Device in accordance with claim 1, said coil having three sections, and said means for feeding said coil alternatively with single-phase and multi-phase current comprising three frequency converters each coupled to one coil section, the means for feeding said converters in the three-phase alternative including feeding devices with adjustable phase angle.

4. Method of inductive stirring and heating of a melt in a ladle, comprising, in one step, feeding a coil positioned outside a metallic casing which surrounds the ladle with single phase AC current for heat retaining and, in another step, feeding said coil with multi-phase AC current for stirring the melt in the ladle, said AC current, at least during stirring, having a frequency of 0.1 to 10 cycles per second.

References Cited

UNITED STATES PATENTS

| | | | |
|---|---|---|---|
| 3,053,921 | 9/1962 | Tagliaferri | 13—28 |
| 3,251,921 | 5/1966 | Hartley | 13—28 |
| 3,330,900 | 7/1967 | Taylor et al. | 13—27 X |
| 1,943,802 | 1/1934 | Northrup. | |
| 2,972,652 | 2/1961 | Seemann et al. | 13—27 |
| 3,314,670 | 4/1967 | Kennedy | 13—31 X |
| | | | 13—27 X |

RICHARD M. WOOD, *Primary Examiner.*

L. H. BENDER, *Assistant Examiner.*